United States Patent
McClanahan (10) Patent No.: US 8,210,694 B1
(45) Date of Patent: Jul. 3, 2012

(54) PAIR OF CONCAVE MIRRORS FOR PROJECTING NON-INVERTED REAL IMAGES

(75) Inventor: Stephen McClanahan, Clearwater, FL (US)

(73) Assignee: University of South Florida, Tampa, FL (US)

( * ) Notice: Subject to any disclaimer, the term of this patent is extended or adjusted under 35 U.S.C. 154(b) by 554 days.

(21) Appl. No.: 12/167,757

(22) Filed: Jul. 3, 2008

Related U.S. Application Data (60) Provisional application No. 60/947,790, filed on Jul. 3, 2007, provisional application No. 60/949,668, filed on Jul. 13, 2007.

(51) Int. Cl.
*G02B 17/06* (2006.01)
*G02B 27/18* (2006.01)

(52) U.S. Cl. ........................................ 359/858; 359/861
(58) Field of Classification Search .................. 359/850, 359/855–858, 860, 861
See application file for complete search history.

(56) References Cited

U.S. PATENT DOCUMENTS

| | | | |
|---|---|---|---|
| 922,722 A | 5/1909 | Salle | |
| 2,576,147 A | 11/1951 | Sauvage | |
| 2,628,533 A | 2/1953 | Oetjen | |
| 2,860,557 A * | 11/1958 | Moore et al. | 396/351 |
| 3,096,389 A | 7/1963 | Dudley | |
| 3,647,284 A | 3/1972 | Elings et al. | |
| 3,893,754 A * | 7/1975 | McInally | 359/858 |
| 3,963,328 A * | 6/1976 | Abel | 359/859 |
| 4,623,223 A | 11/1986 | Kempf | |
| 4,776,118 A | 10/1988 | Mizuno | |
| 4,802,750 A | 2/1989 | Welck | |
| 5,257,130 A | 10/1993 | Monroe | |
| 5,311,357 A | 5/1994 | Summer et al. | |
| 5,552,934 A | 9/1996 | Prince | |
| 5,687,025 A * | 11/1997 | Nanba | 359/633 |
| 5,977,938 A * | 11/1999 | Iwasa | 345/32 |
| 6,022,114 A * | 2/2000 | Foo | 359/853 |
| 6,435,934 B1 | 8/2002 | Bender | |
| 6,478,432 B1 | 11/2002 | Dyner | |
| 6,497,484 B1 | 12/2002 | Hoerner et al. | |
| 6,568,818 B2 | 5/2003 | Holden et al. | |
| 6,767,099 B2 | 7/2004 | Perkins et al. | |
| 2007/0008636 A1* | 1/2007 | Cuo | 359/857 |
| 2007/0188898 A1* | 8/2007 | McClanahan | 359/859 |
| 2007/0279633 A1* | 12/2007 | Yi et al. | 356/432 |

* cited by examiner

*Primary Examiner* — Mark Consilvio
(74) *Attorney, Agent, or Firm* — Robert Varkonyi; Smith & Hopen, P.A.

(57) ABSTRACT

The optical device projects a three dimensional image into free space. A series of minors are aligned thereby allowing an image reflect three times between the two minors. The distance between the mirrors may be altered, changing the size and orientation of the final image. In other arrangements, the minors are aligned to permit an image to reflect five times. The minors of the device are concave, may be spherical or parabolic, and may be fragments of a spherical or parabolic minor.

20 Claims, 8 Drawing Sheets

PAIR OF CONCAVE MIRRORS FOR PROJECTING NON-INVERTED REAL IMAGES

CROSS REFERENCE TO RELATED APPLICATIONS

This application claims priority to currently pending U.S. Provisional Patent Applications 60/947,790, entitled, "Method and Apparatus for Projecting an Image in Free Space", filed Jul. 3, 2007, and 60/949,668, entitled, "Method and Apparatus for Projecting an Image in Free Space", filed Jul. 13, 2007, the contents of which are herein incorporated by reference.

FIELD OF INVENTION

This invention relates to a method and apparatus for creating a three-dimensional illusion of an object by projecting a real image reflection into free space. Specifically, the invention is a method and device comprising a series of mirrors to reflect an image into free space.

BACKGROUND OF THE INVENTION

For hundreds of years, people have seen their reflection behind the mirror. A person standing three feet from a conventional mirror is required to focus six feet in front of himself to view the reflection, as the image travels three feet to the mirror and three feet back to the user. Over 75 million Americans are near sighted. Near sighted individuals lack the ability to focus on distant objects, and for such people, a reflection is lost or blurred. Typically, a concave mirror is utilized to project an image into space.

There are many devices which use the reflective properties of optics to project a real image reflection of an object into free space. These images have been used to create optical illusions and special effects for entertainment. The images are created by light, reflected off a real object, which is focused to a region of space. The convergent light results in a real image.

In some of these devices, a concave mirror is used to project an image to an observer. For example, U.S. Pat. No. 3,647,284 uses two opposing parabolic concave mirrors to project an object at one focal length to the other focal length. The real image of the object is projected through a small aperture in the surface of one mirror. U.S. Pat. No. 5,257,130 projects a real object to an observer using two concave, offset surfaces. The image is reflected off each concave surface once; a first time to collect light from the image and reflect the light in parallel rays, and a second time to refocus the light at a point, creating a real image.

Many of the described devices are incapable of producing images that appear located in space beyond the mirrored device or require large concave mirrors with a large radius to project a reflection away from the mirror configuration. Additionally, many devices require the object be positioned at a strict location and likewise constrains the location of the final real image reflection.

The enumerated constraints limit use of these devices, and preclude use by the general public due to the complexity of the design. Accordingly, there exists a need for an improved image projecting device that provides three-dimensional real images in a user-friendly manner.

SUMMARY OF THE INVENTION

The present invention utilizes a pair of parabolic mirrors to provide a projected real image to an observer. The device projects a reflection in front of the mirror, allowing an observer to focus on a reflection much closer to his face. Two concave mirrored surfaces provide three internal reflections, creating a non-inverted real image reflection of the observer. The device utilizes optic principles dictating the magnification, orientation, and position of an image based on where an object is placed in relation to a concave mirror's focal point and the radius.

The present invention comprises two concave mirrors which face each other and lie on the same optical axis. The distance between the vertices of those concave mirrors is greater than the focal length and less than the radius of each mirror. Thus, then when an object is placed a distance greater than the radius of the concave mirror configuration, then a minified non-inverted real image is created in between the focal point and the radius. The formation of the non-inverted real image requires three reflections off the concave surfaces. By varying the distance between the two mirrors, the device does not require large mirror to project the real image away from the mirror to the observer.

The observer views the mirror from a position beyond the center point of the first concave mirror creating an inverted real image reflection, which is reflected off the second concave mirror to produce a still-inverted magnified virtual image reflection. The magnified virtual image is then reflected off the first concave mirror, producing the non-inverted real image reflection. The location of the final real image reflection can be controlled by the distance between the two concave mirrors. The distance of the projected image is a function of the distance between the two mirrors. Decreasing the distance between the two concave mirrors projects the final real image reflection further away from the device. The result is confirmed by analyzing the optical transfer functions of the device. Combining the optical transfer functions for drift space and a reflection off a concave surface, yielding the location of the real image reflection.

The distance between the two concave mirrors is not required to be equal to the radius of curvature. Varying the distance between the two concave mirrors, the resulting transfer matrix indicates the location of the real image created is a direct result of the length of the distance between the vertices of the two mirrors. Further, the location of the real image is related to the radius of the concave mirrors and the distance between vertices.

Two parabolic concave mirrors share a common optical axis, with the distance between the vertices of these parabolic surfaces ranges from the focal length to twice the focal length. The mirrors may use the same size focal length or may have varying focal lengths where mirror 1 has a larger focal length or mirror 2 has the larger focal length. Depending on the distance an object is located from the vertex of the concave mirror, a real image would be projected in-between the object and the concave parabolic mirror configuration. Since both parabolic concave surfaces share a common optical axis, both the object and projected real image lie in the same optical axis. The device projects a real image reflection of an observer to him or herself and uses three reflections off two concave surfaces.

The real image reflection generated by the optical configuration can be composed of the various types from the conical family of curves whether that shape is spherical, paraboloic, hyperbolic, or aspheric. Further, the optical device can combine different conical forms in the same system in order to optimize the optical configuration. Thus, variations in the conical shapes can be utilized as in the case of a Mangin Mirror.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the present invention, "inverted" means the orientation of the image in relation to the source-object, and does not address the manner of reflection in the mirror. For example, image reflects off a concave mirror, flipping the object to produce a real image. As the image is flipped, in relation to the source-object, and therefore is an inverted image. However, should this inverted image strike another concave mirror, thereby flipping the image a second time, this image is described as non-inverted.

Figure 1:
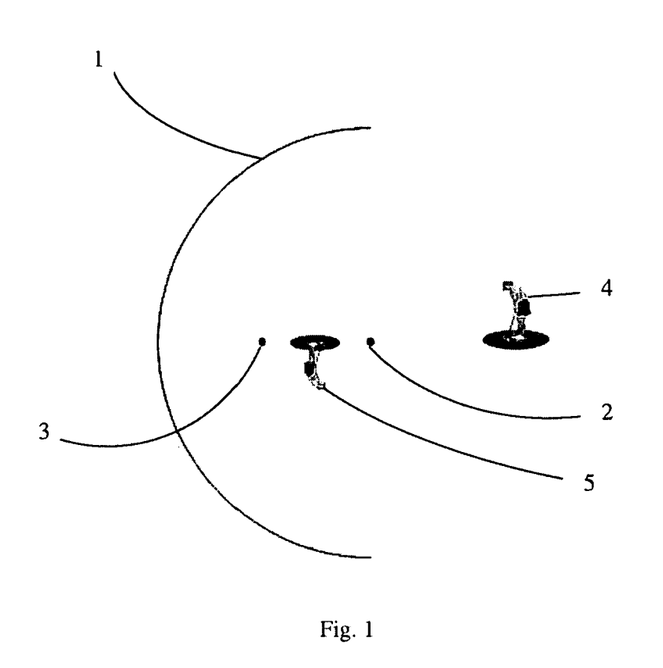
FIG. 1 depicts an image reflection off a parabolic mirror, where the source-object is beyond the focal point of the mirror.
Figure 2:
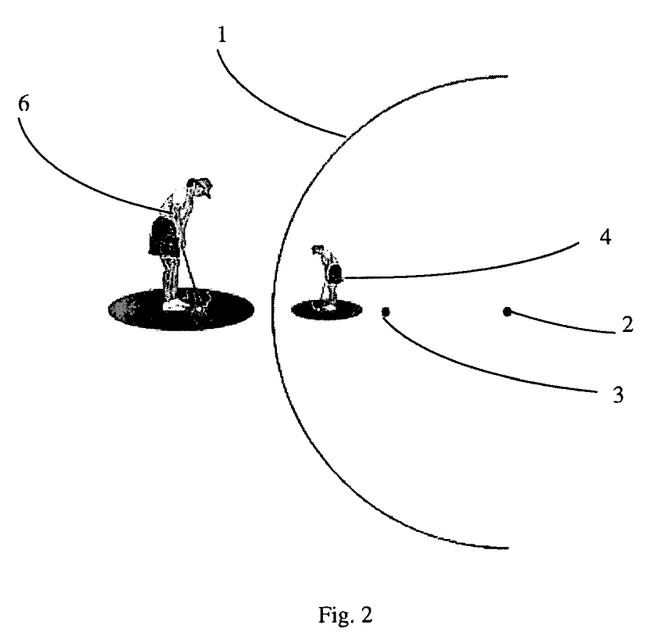
FIG. 2 depicts an image reflection off a parabolic mirror, where the source-object is between the mirror and focal point of the mirror.

The present invention relies on the defined characteristics of reflective optics. FIG. 1 depicts first concave mirror 1, with radius 2 and focal point 3. Placing object 4 farther from radius 2 of first concave mirror 1 produces a miniaturized, inverted real image 5 between radius 2 and focal point 3. However, if object 4 is placed closer to first concave mirror 1 than focal point 3, a non-inverted, enlarged virtual image 6 is created, as seen in FIG. 2.

Figure 3:
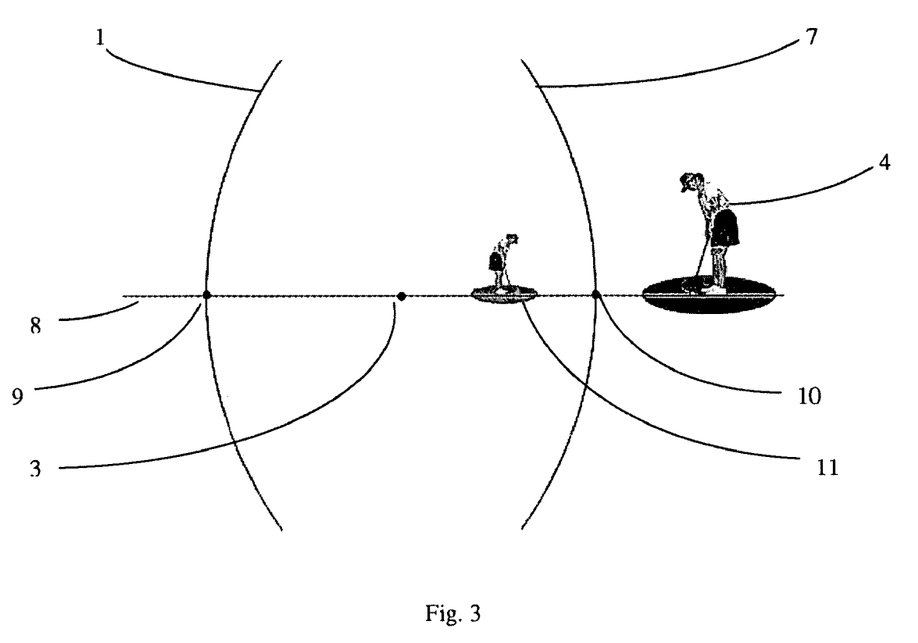
FIG. 3 depicts a cross section view of the invention using two, equal-sized concave mirrors. The mirrors are two focal lengths apart.

The device comprises first concave mirror 1 oriented on common optical axis 8. Second concave mirror 7 is disposed adjacent to first concave mirror 1 on common optical axis 8, with the reflective surfaces facing each other, seen in FIG. 3. The distance between first vertex 9 of first concave mirror 1 and second vertex 10 of second concave mirror 8 may range from one to two focal lengths. Once object 4 enters the focal range of the device, determined by the distance from the vertex of the concave mirror, real image 11 is projected in-between the object and the concave parabolic mirror configuration. Since both parabolic concave surfaces share a common optical axis, both the object and projected real image lie in the same optical axis.

Figure 4:
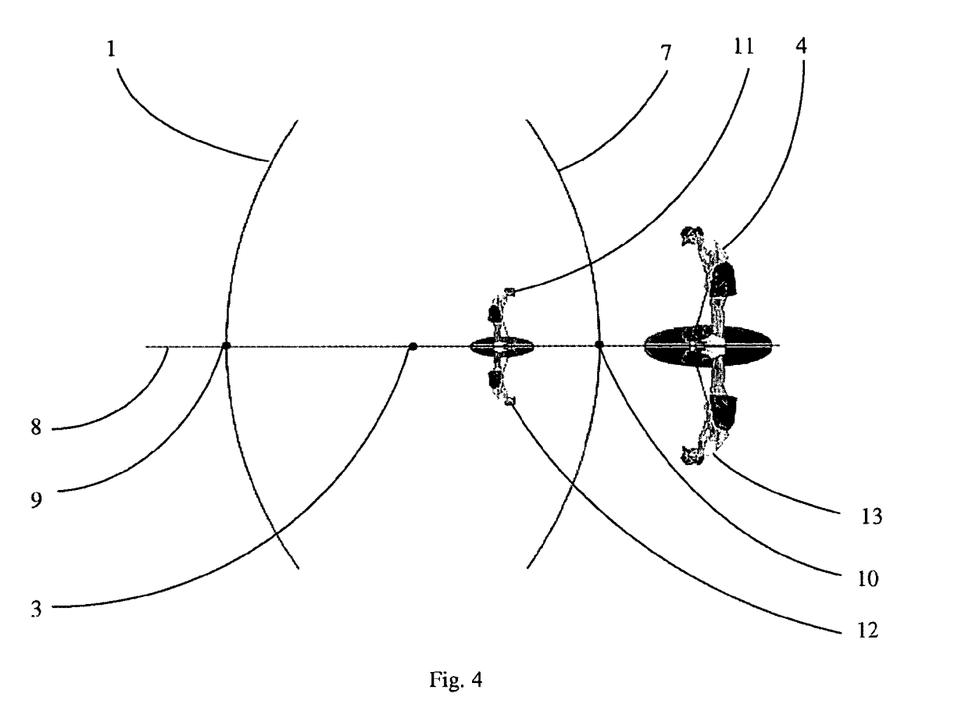
FIG. 4 depicts a cross section view of the invention and the intermediary images created from reflections between the two, equal-sized concave mirrors. The mirrors are two focal lengths apart.

The device uses two mirrors to generate three reflections in forming real image 11. As seen in FIG. 4, object 4 enters the focal range of the device and the image of object 4 strikes first concave mirror 1 producing inverted, real image 12. The inverted, real image is focused between second vertex 10 and the focal point of second concave mirror 8, and serves as the source/object for the second concave mirror. Second concave mirror 8 produces inverted, magnified virtual image 13. Inverted, magnified virtual image 13 is reflected back to first concave mirror 1, focusing as an image behind first concave mirror 1. This image serves as the source/object for first concave mirror 1, producing real image 11, which is non-inverted and miniaturized image of virtual image 13. In some embodiments, the constructed device is 2 ft tall, 1.5 ft wide, and 0.5 ft deep. This allows the device to project an image 2 ft from a user when the user stands 4 feet in front of device.

The location and magnification of final real image 11 in FIG. 4 can be calculated from optical matrix transformations. The reflection matrix for a concave mirror is equal to Eq 1, where r is the radius of the concave mirror.

$$\begin{bmatrix} 1 & 0 \\ 2/r & 1 \end{bmatrix} \quad \text{Eq 1}$$

The matrix for drift space is shown in Eq 2.

$$\begin{bmatrix} 1 & d \\ 0 & 1 \end{bmatrix} \quad \text{Eq 2}$$

Describing the current optical system using matrixes in Eq 1 and Eq 2 provides Eq 3, where i represents the distance from the real image to the first concave mirror and d is the distance from the object to the first concave mirror.

$$\begin{bmatrix} 1 & i \\ 0 & 1 \end{bmatrix}\begin{bmatrix} 1 & 0 \\ 2/r & 1 \end{bmatrix}\begin{bmatrix} 1 & -r \\ 0 & 1 \end{bmatrix}\begin{bmatrix} 1 & 0 \\ 2/r & 1 \end{bmatrix} \quad \text{Eq 3}$$
$$\begin{bmatrix} 1 & -r \\ 0 & 1 \end{bmatrix}\begin{bmatrix} 1 & 0 \\ 2/r & 1 \end{bmatrix}\begin{bmatrix} 1 & d \\ 0 & 1 \end{bmatrix}$$

The resulting simplified transfer matrix is shown in Eq 4.

$$\begin{bmatrix} -1 - \dfrac{2i}{r} & -\dfrac{2di + dr + ir}{r} \\ -\dfrac{2}{r} & -1 - \dfrac{2d}{r} \end{bmatrix} \quad \text{Eq 4}$$

The A matrix term represents the magnification of the final real image. To yield a magnification of +1, i's value is required to be −r. The B matrix defines the location where the rays become focused. Substituting −r for i into the B matrix and solving for d, when the B matrix term equals 0, yields a value of d equal to −r. Therefore, when the distance between first vertex 9 and second vertex 10 is equal to the radius and when an object is placed at a distance equal to the radius from first concave mirror 1, a real, non-inverted image is produced with magnification of +1 located at a distance equal to the radius. Therefore, where the distance between the mirrors equals the radius of the mirrors, the final real image 11, forms at the same location as object 4.

Figure 5:
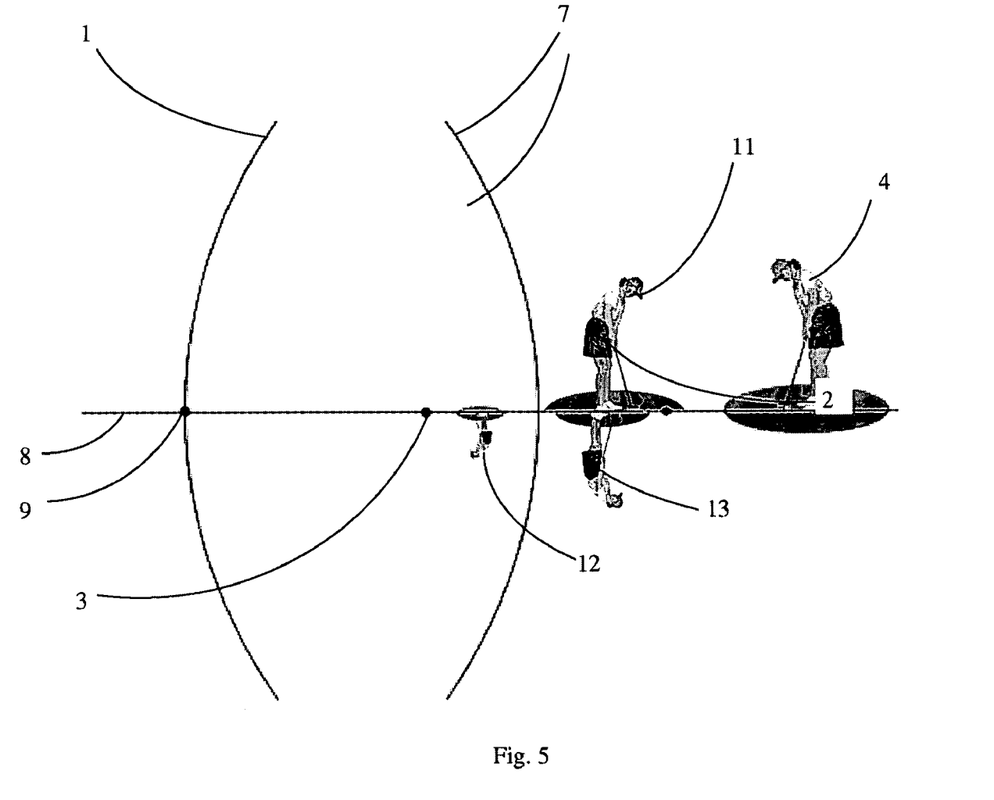
FIG. 5 depicts a cross section view of the invention and the intermediary images created from reflections between the two, equal-sized concave mirrors. The mirrors are closer than two focal lengths apart.

The distance between the vertices of the mirrors is not required to be equal to the radius of the concave mirrors as shown in FIGS. 1 through 4 and as expressed in Eqs 3 and 4. The distance between the vertices could actually be in between the focal length and the length of the radius, seen in FIG. 5. Manipulating the distance between first concave mirror 1 and second concave mirror 7, allows manipulating of both the position and size of real image 11. To maximize the size and projection distance from first concave mirror 1, second concave mirror 7 is disposed such that its vertex lies substantially on focal point 3. Increasing the distance between first concave mirror 1 and second concave mirror 7 causes the final image to be projected closer to first concave mirror 1 and at a reduced size. As the distance between the vertices decreases from the length of the radius to the focal length the location of the real image created exists further and further from the device.

The location of the real image created by the optical system depends directly on the length of the distance between the vertices, d in Eq 5. Redefining the transfer matrix to allow a variable distance d to represent the distance between the vertices results in Eq 5 where i represents the location of the object and created image and r represents the radius of the concave mirrors.

$$\begin{bmatrix} 1 & i \\ 0 & 1 \end{bmatrix}\begin{bmatrix} 1 & 0 \\ 2/r & 1 \end{bmatrix}\begin{bmatrix} 1 & -d \\ 0 & 1 \end{bmatrix}\begin{bmatrix} 1 & 0 \\ 2/r & 1 \end{bmatrix} \quad \text{Eq 5}$$
$$\begin{bmatrix} 1 & -d \\ 0 & 1 \end{bmatrix}\begin{bmatrix} 1 & 0 \\ 2/r & 1 \end{bmatrix}\begin{bmatrix} 1 & i \\ 0 & 1 \end{bmatrix}$$

When Eq 5 is solved and the condition for the A matrix to be equal to +1, the location of the real image created is a direct result of the length of the distance between the two vertices. Eq 6 shows the relation between the location of the real image with respect to the radius of the concave mirrors, r, and the distance between vertices, d.

$$i = \frac{d*r}{2d-r} \quad \text{Eq 6}$$

Using the resulting transfer matrix of Eq 5 to calculate when the real image focuses to a point (the B matrix terms goes to 0) also results in the same solution of Eq 6.

Therefore, the magnification of an object located beyond the radius of the concave mirror can be made to be equal to +1 simply by increasing or decreasing the distance between the vertices of the concave mirrors as defined by Eq 6.

Figure 6:
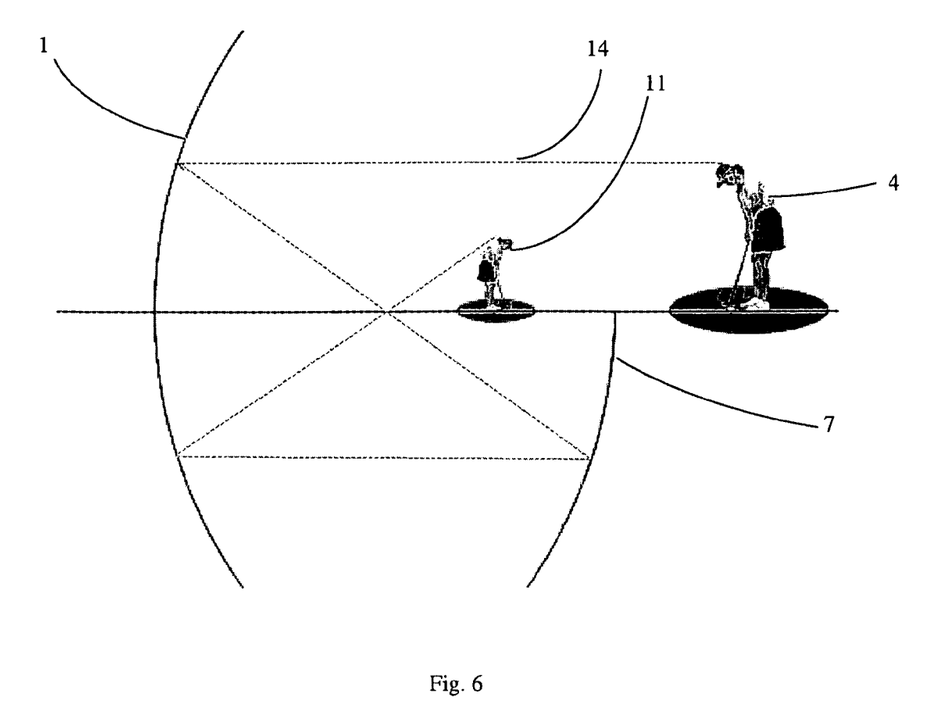
FIG. 6 depicts a cross section view of the invention and the invention using one full mirror and a second, fragmentary mirror.

The entire concave surface, whether spherical or parabolic, is not required to form the real image. Depending on the placement of the original object, a fraction of the concave minor is required to produce the real image, as seen in FIG. 6. Object 4 is reflected off first concave minor 1, second concave minor 7 and again off first concave mirror 1 to generate final real image 11. As only a portion of the concave surface is used to generate the reflection, the real image reflection is likewise limited in the range it is visible. Some rays that would have been reflected to produce a full real image reflection are cut-off. However, only a fraction of those rays are required to produce a reflection visible from a particular angle. Therefore, the reflection is limited to a particular viewpoint decided by the placement of the concave minors and the fractional section of mirrors utilized. In addition, the second internal reflection was previously assumed to create a magnified virtual image reflection.

Figure 7:
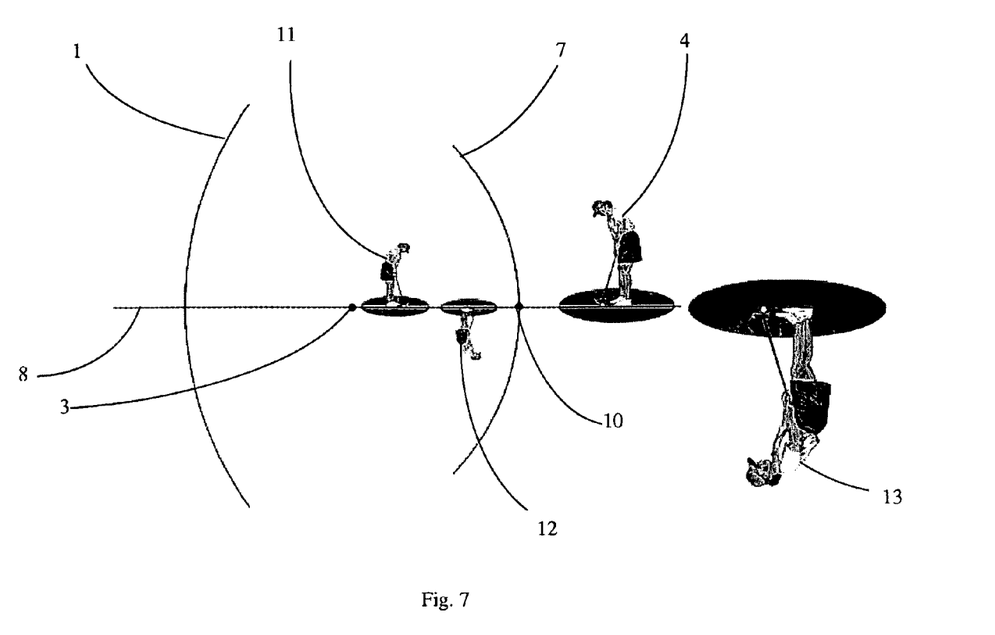
FIG. 7 depicts a cross section view of the invention and the intermediary images created from reflections between the one larger (by focal length) concave mirrors and one smaller (by focal length) concave mirror.

Previously, the optical configurations have utilized two concave mirrors comprising identical focal lengths. However, by changing the focal length of one or both of the concave minors, the location and magnification of the real image projection can be manipulated. Turning to FIG. 7, second concave mirror 7 has about a 25% smaller focal length than the first concave mirror 1. Object 4 creates an inverted real image 12 between focal point 3 and second vertex 10. Second concave mirror 7 creates a greatly magnified virtual image 13, which reflects off first concave mirror 1 to create non-inverted real image 11. In this embodiment, the final real image reflection is larger than if two identical focal length concave mirrors were used, however, the location of the real image reflection is deeper within the optical device. When second concave mirror 7 has a focal length larger than the focal length of first concave mirror 1, real image 11 is smaller than the magnification shown in FIG. 7, but the location of the real image reflection is farther outside the optical device. Thus, the distance between the two concave surfaces whether they have the same focal length or not can adjust the magnification and location of the final real image reflection anywhere from several inches from within the optical configuration to several feet outside the optical configuration, regardless of whether the focal lengths of the concave minors are identical.

Figure 8:
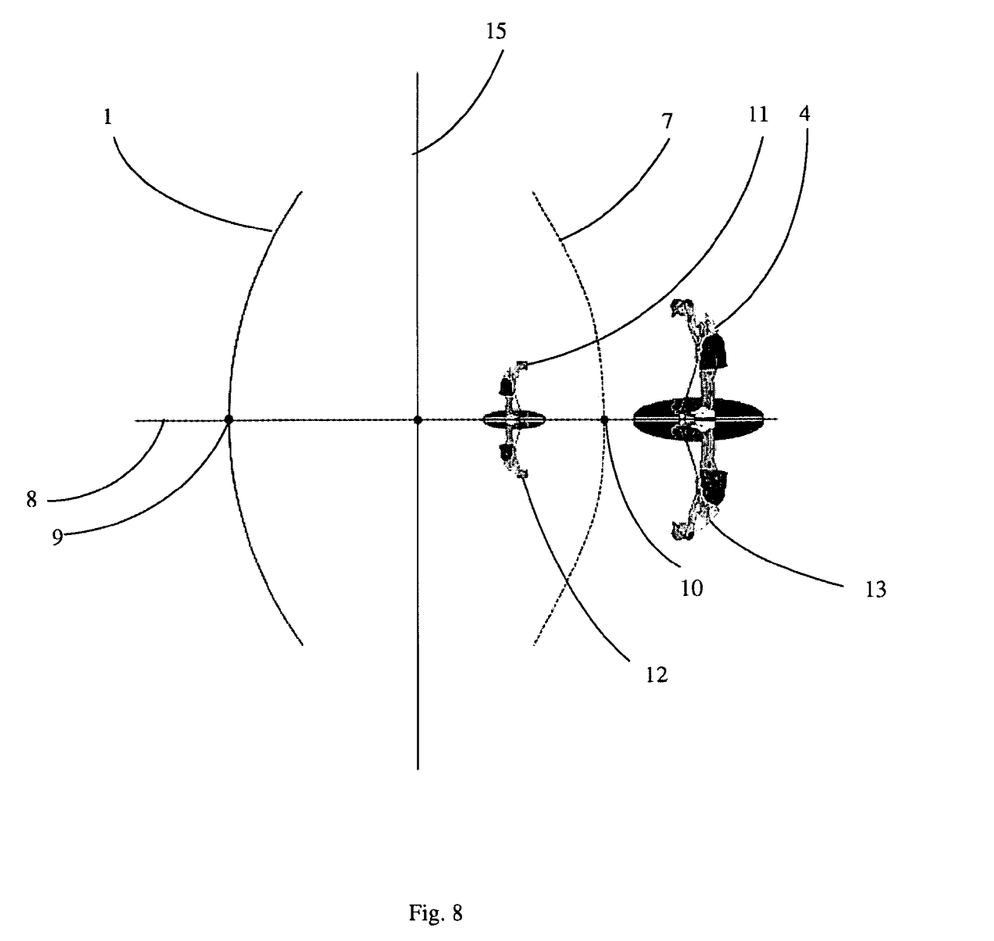
FIG. 8 depicts a cross section view of the invention using one concave mirror and a flat mirror to create a virtual second mirror.

Noting the symmetry in the various optical configurations presented, a flat mirror can be placed along the axis of symmetry to generate a virtual concave mirror. Turning to FIG. 8, flat minor 15 is facing first concave mirror 1, creating a virtual second concave minor 7. Object 4 creates real image reflection 12 that is located behind the flat minor 15, between flat minor 15 and virtual vertex 10 of virtual second concave minor 7. Virtual second concave mirror 7 creates a magnified virtual image 13, which reflects off first concave mirror 1 creating final, non-inverted real image 11.

Figure 9:
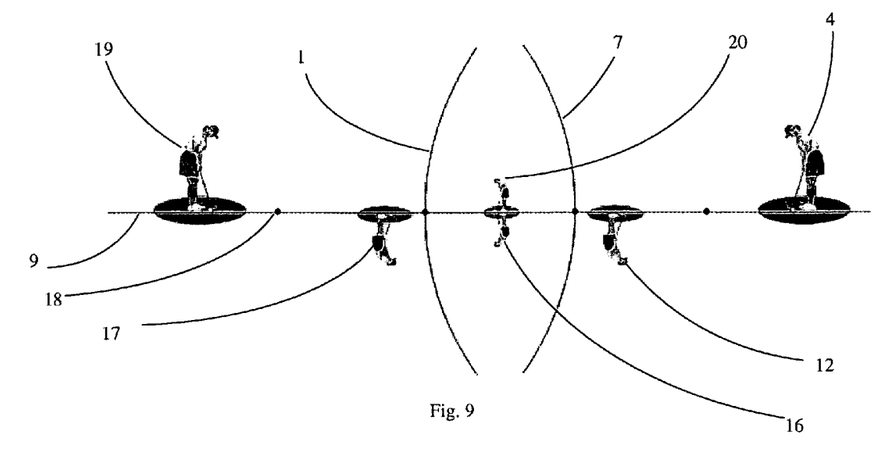
FIG. 9 depicts a cross section view of the invention and the intermediary images created from reflections between the two, equal-sized concave mirrors where the mirrors are aligned to produce five reflections.

The device described thusfar utilizes three reflections to generate a three dimensional image. A real image reflection can also be generated from five reflections off the concave surfaces as seen in FIG. 9. Object 4 is disposed on the same optical axis 9 of concave mirror 1 and concave minor 7. Object 4 is first reflected off the first concave mirror 1 to create real image 12. Since real image 12 is located behind second concave minor 7, a second real image 16 is generated. Second real image 16 is located between the first vertex 9 and focal length 3, thereby generating virtual reflection 17, located between the focal length of second concave mirror 7 and center 18 of second concave mirror 7. Virtual reflection 17 reflects off second concave mirror 7 generating real image 19, located behind first concave mirror 1. Because real image 19 is located behind first concave minor 1, the final fifth reflection generates real image 20. Like the three-reflection embodiment, changing the distance between the two concave mirrors results in different locations of the final real image reflection. The smaller the distance between the two concave mirrors, the further out the real image reflection is projected from the concave minors.

Also as proven in the previous embodiment with three-reflections, only a portion of the concave mirrors is required to generate the real image reflection, understanding that the real image reflection would be confined to a particular viewing angle.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. An optical device consisting essentially of:
    a first concave mirror with a focal point on an optical axis;
    a second concave mirror aligned on the same optical axis as the first concave mirror, such that the reflective surface of the first concave mirror faces the reflective surface of the second concave mirror;
    whereby the second concave mirror is disposed in relation to the first concave mirror such that the first concave mirror and second concave mirror produce a non-inverted image; and
    an object disposed beyond the focal point on the first concave mirror.

2. The device of claim 1, wherein the first mirror and the second mirror are disposed between one and two focal lengths.

3. The device of claim 1, wherein the distance between the mirrors is equivalent to the radius of at least one mirror.

4. The device of claim 1, wherein the first mirror is a fragment of the group consisting of a sphere and a parabola.

5. The device of claim 1, wherein the second mirror is a fragment of the group consisting of a sphere and a parabola.

6. The device of claim 1, wherein the first mirror and second mirror are disposed to reflect an image three times before projecting the image.

7. The device of claim 1, wherein the position and size of the non-inverted image is adjusted by altering the distance between the first mirror and the second mirror.

8. The device of claim 1, wherein the first mirror and second mirror are disposed to reflect an image five times before projecting the image.

9. The device of claim 1, wherein the first concave mirror and second concave mirror are selected from the group consisting of spherical mirrors and parabolic mirrors.

10. The device of claim 1, wherein the first mirror and second mirror are disposed to reflect an image three times before projecting the image.

11. The device of claim 1, wherein the first mirror and second mirror are disposed to reflect an image five times before projecting the image.

12. The device of claim 1, wherein the first mirror and second mirror have different focal lengths.

13. A method of projecting a three dimensional reflective image consisting essentially of:
    providing a first concave mirror on an optical axis;
    providing a second concave mirror aligned on the optical axis, such that the reflective surface of the first concave mirror faces the reflective surface of the second concave mirror;
    placing an object beyond the focal point of the first concave mirror; and
    adjusting the second concave mirror in relation to the first concave mirror such that the first concave mirror and second concave mirror produce a non-inverted image of the object.

14. The method of claim 13, wherein the second mirror is adjusted such that the vertex of the second mirror is disposed in proximity to the focal point of the first mirror.

15. The device of claim 13, wherein the position and size of the non-inverted image is adjusted by altering the distance between the first mirror and the second mirror.

16. The device of claim 13, wherein the first concave mirror and second concave mirror are selected from the group consisting of spherical mirrors and parabolic mirrors.

17. The device of claim 13, wherein the first mirror and the second mirror are disposed between one and two focal lengths.

18. The device of claim 17, wherein the distance between the mirrors is equivalent to the radius of the mirrors.

19. The device of claim 13, wherein the first mirror is a fragment of the group consisting of a sphere and a parabola.

20. The device of claim 13, wherein the second mirror is a fragment of the group consisting of a sphere and a parabola.

* * * * *